United States Patent
Horning et al.

(10) Patent No.: US 6,550,328 B1
(45) Date of Patent: Apr. 22, 2003

(54) DYNAMIC BALANCE CORRECTION FOR A DISC DRIVE

(75) Inventors: Stephen G. Horning, Oklahoma City, OK (US); Thomas H. Chuang, Oklahoma City, OK (US); Tommy J. Metzner, Oklahoma City, OK (US); Arnold G. Slezak, Yukon, OK (US)

(73) Assignee: JpMorgan Chase Bank, New York, NY (US)

( * ) Notice: Subject to any disclaimer, the term of this patent is extended or adjusted under 35 U.S.C. 154(b) by 8 days.

(21) Appl. No.: 09/641,906

(22) Filed: Aug. 18, 2000

Related U.S. Application Data (60) Provisional application No. 60/150,144, filed on Aug. 20, 1999.

(51) Int. Cl.⁷ .................................................. G01M 1/16
(52) U.S. Cl. ....................................... 73/468; 360/99.12
(58) Field of Search .................. 73/66, 468; 360/98.07, 360/98.08, 99.04, 99.05, 99.08, 99.09, 99.12; 74/573 R (56) References Cited

U.S. PATENT DOCUMENTS

| | | |
|---|---|---|
| 3,817,088 A | 6/1974 | Herbig |
| 4,561,035 A | 12/1985 | McDorman et al. |
| 4,780,593 A | 10/1988 | Kato |
| 4,933,583 A | 6/1990 | Ripplinger |
| 4,949,579 A | 8/1990 | Nayar |
| 5,130,870 A | 7/1992 | Jabbari |
| 5,141,768 A | 8/1992 | Ibe et al. |
| 5,391,952 A | 2/1995 | Simazu et al. |
| 5,404,636 A | 4/1995 | Stefansky et al. |
| 5,450,337 A | 9/1995 | Chuan-Yuan et al. |
| 5,537,272 A | 7/1996 | Kazmierczak et al. |
| 5,555,144 A | 9/1996 | Wood et al. |
| 5,572,382 A | 11/1996 | Kuno |
| 5,621,588 A | 4/1997 | Williams et al. |
| 5,811,678 A | 9/1998 | Hirano |
| 5,824,898 A | 10/1998 | Brooks et al. |
| 5,987,735 A | 11/1999 | Horning et al. |
| 6,049,969 A | 4/2000 | Jenkins et al. |

*Primary Examiner*—Richard A. Moller (57) ABSTRACT

Method for balancing a rotary object, such as a disc drive disc pack. A balance correction member is provided as a C-shaped ring formed from a length of wire of nominally uniform cross-sectional area. The member has a substantially elliptical shape in an uncompressed state. During installation, the amount of imbalance in the disc pack is measured and a member with an appropriate length is selected and compressed to a substantially circular shape. The compressed member is then placed adjacent the disc pack so that the member expands to compressingly engage an annular recess in the disc pack. The member is preferably installed using an automated dynamic balance correction station as part of a high volume disc drive manufacturing environment.

9 Claims, 7 Drawing Sheets

DYNAMIC BALANCE CORRECTION FOR A DISC DRIVE

RELATED APPLICATIONS

This application claims priority to U.S. Provisional Application No. 60/150,144 filed Aug. 20, 1999.

FIELD OF THE INVENTION

The present invention relates generally to the field of disc drive data storage devices, and more particularly, but not by way of limitation, to an automated assembly of a disc drive head-disc assembly which includes an automated dynamic balance correction station.

BACKGROUND

Modem hard disc drives are commonly used in a multitude of computer environments ranging from super computers through notebook computers to store large amounts of data in a form that can be made readily available to a user. Typically, a disc drive comprises one or more magnetic discs that are rotated by a spindle motor at a constant high speed. The surface of each disc serves as a data recording surface and is divided into a series of generally concentric recording tracks radially spaced across a band between an inner diameter and an outer diameter. The data tracks extend around the disc and data is stored within the tracks on the disc surface in the form of magnetic flux transitions. The flux transitions are induced by an array of transducers otherwise commonly called read/write heads. Typically, each data track is divided into a number of data sectors that store fixed sized data blocks.

Each read/write head includes an interactive element such as a magnetic transducer which senses the magnetic transitions on a selected data track to read the data stored on the track. Alternatively, the read/write head transmits an electrical signal that induces magnetic transitions on the selected data track to write data to the track. As is known in the art, the read/write heads are supported by rotary actuator arms and are positioned by the actuator arms over a selected data track to either read or write data. The read/write head includes a slider assembly having an air-bearing surface that causes the read/write head to fly relative to the disc surface. The air bearing is developed by load forces applied to the read/write head by a load arm interacting with air currents produced by disc rotation.

Typically, several open-centered discs and spacer rings are alternately stacked on the hub of a spindle motor, followed by the attachment of a clampring to form a disc pack. The hub, defining the core of the stack, serves to align the discs and spacer rings around a common centerline. Movement of the discs and spacer rings is typically constrained by a compressive load maintained by the clampring. The complementary actuator arms of an actuator assembly, commonly called an E-block, support the read/write heads to access the surfaces of the stacked discs of the disc pack. The read/write heads communicate electronically with a printed circuit board assembly (PCB) through read/write wires and a flex circuit attached to the E-block. When the E-block is merged with the disc pack into a base deck and a cover is attached to the base deck, a head-disc assembly (HDA) is formed. For a general discussion of E-block assembly techniques, see U.S. Pat. No. 5,404,636 issued to Stefansky et al. and assigned to the assignee of the present invention.

The head-disc assembly (HDA) of a disc drive is typically assembled in a clean room environment. A clean room environment (free of contaminants of 0.3 micron and larger) is necessary to ensure that the head-disc interface remains unencumbered and damage free. The slightest damage to the surface of a disc or read/write head can result in a catastrophic failure of the disc drive. The primary causes of catastrophic failure, particularly read/write head crashes (a non-recoverable, catastrophic failure of the disc drive) are generally characterized as contamination, exposure to mechanically induced shock and non-shock induced damage. The source of non-shock induced damage is typically traced to the assembly process, and generally stems from handling damage sustained by the disc drive during the assembly process.

Several factors that bear particularly on the problem of assembly process induced damage are the physical size of the disc drive, the spacing of the components, the recording densities sought to be achieved and the level of precision to be maintained during the assembly process. The high levels of precision required by the assembly process are necessary to attain the operational tolerances required by the disc drive. The rigorous operational tolerances are in response to market demands that have driven the need to decrease the physical size of disc drives while simultaneously increasing disc drive storage capacity and performance characteristics.

Demands on disc drive mechanical components and assembly procedures have become increasingly more critical in order to meet the strenuous requirements of increased capability and size reduction in the face of these new market demands. Part-to-part variations in critical functional attributes in the magnitude of micro-inches can result in disc drive failures. Additionally, as disc drive designs continue to require size reduction, smaller read/write heads, thinner substraights, longer and thinner actuator arms, and thinner gimbal assemblies must continue to be incorporated into the drives. This trend significantly exacerbates the need to improve assembly processes to protect the read/write heads and discs from damage resulting from incidental contact between mating components. The aforementioned factors resultantly increase the difficulty of assembling disc drives, and as the assembly process becomes more difficult, the need to invent new tools, methods and control systems to deal with the emerging complexities pose unique problems in need of solutions.

Coupled with the size and performance demands is the further market driven requirement for, ever increasing fault free performance. The progression of continually thinner disc thickness and tighter disc spacing, together with increasing track density and increasing numbers of discs in the disc pack, has resulted in a demand for tools, methods and control systems of ever increasing sophistication. A result has been a decreasing number of assembly tasks involving direct operator intervention. Many of the tasks involved in modern methods are beyond the capability of operators to reliably and repeatedly perform, further driving the need for automated equipment and tooling.

In addition to the difficulties faced in assembling modem disc drives of high capacity and complex, physical product performance requirements have dictated the need to develop new process technologies to ensure compliance with operating specifications. The primary factors driving more stringent demands on the mechanical components and the assembly process are the continually increasing areal densities and data transfer rates of the disc drives.

The continuing trend in the disc drive industry is to develop products with ever increasing areal densities, decreasing access times and increasing rotational speeds.

The combination of these factors places greater demands on the ability of modem servo systems to control the position of read/write heads relative to data tracks. The ability to assemble HDAs nominally free from the effects caused by unequal load forces on the read/write heads, disc pack imbalance or one of the components of runout, velocity and acceleration (commonly referred to as RVA) poses a significant challenge as track densities increase. The components of RVA are disc runout (a measure of the motion of the disc along the longitudinal axis of the motor as it rotates); velocity (a measure of variations in linear speed of the disc pack across the surface of the disc); and acceleration (a measure of the relative flatness of the discs in the disc pack). By design, a disc drive typically has a discreet threshold level of resistance to withstand rotationally induced noise and instability, below which the servo system is not impaired. Also, a fixed range of load forces must be maintained on the read/write head to ensure proper fly height for data exchange. The operating performance of the disc drive servo system is affected by mechanical factors beyond the effects of mechanically induced read/write head oscillation from disc surface anomalies. Errors are traceable to disc pack imbalance and RVA noise sources. Even with improved approaches to the generation of position error signals in the disc drive servo system, the ability of the system to deal with such issues is finite. The limits of the servo system capability to reliably control the position of the read/write head relative to the data track must not be consumed by the noise present in the HDA resulting from the assembly process. Consumption of the available margin by the assembly process leaves no margin in the system to accommodate changes in the disc drive attributes over the life of the product. An inability to accommodate changes in the disc drive attributes leads to field failures and an overall loss in product reliability, a detrimental impact to product market position.

Thus, in general, there is a need for an improved approach to disc drive-assembling technology to minimize the potential of damage during assembly, to produce product that is design compliant and reliable, and to minimize mechanically induced system noise. One such need is that of an automated dynamic balance correction of a disc drive.

SUMMARY OF THE INVENTION

An automated dynamic balance correction station used to produce balance corrected disc drive assemblies by placing a balance correction member on disc packs displaying an out of balance condition. The balance correction station has a conveyor, a lift and balance measure assembly, a lift and locate assembly, a feature detection assembly and a balance correct assembly. The disc drive assembly includes a disc pack that has a spindle motor with an attached spindle motor hub that has a timing mark and supports a stack of interleaved member parts. The stacked member parts include discs, spacer rings and enlarged stack rings constrained by a clampring that has an annular balance correction containment cavity.

The disc drive is moved via the conveyor to the lift and balance measure assembly where the disc pack is lifted and activated to operational speed. At operational speed the lift and balance measure assembly checks for and measures, if present, the amount of imbalance present in the disc pack. If imbalance is present, the dynamic balance correction station determines the angular position of the source of the imbalance relative to the timing mark. Using the feature detection assembly to determine the angular placement position for the balance correction member relative to the timing mark and using the balance correct assembly to physically place the balance correction member on the disc pack, the dynamic balance correction station dispenses the balance correction member into the annular balance correction containment cavity to form a balance corrected disc pack.

The balance correction member comprises a C-shaped ring formed from a wire of nominally uniform cross-sectional area and has a substantially elliptical shape in an uncompressed state. The balance correct assembly compresses the balance correction member to a substantially circular shape and then places the compressed balance correction member adjacent the disc pack so that the compressed balance correction member expands and compressingly engages an annular recess in the disc pack.

These and other features and advantages which characterize the present invention will be apparent from a reading of the following detailed description and a review of the associated drawings.

DETAILED DESCRIPTION

Figure 1:
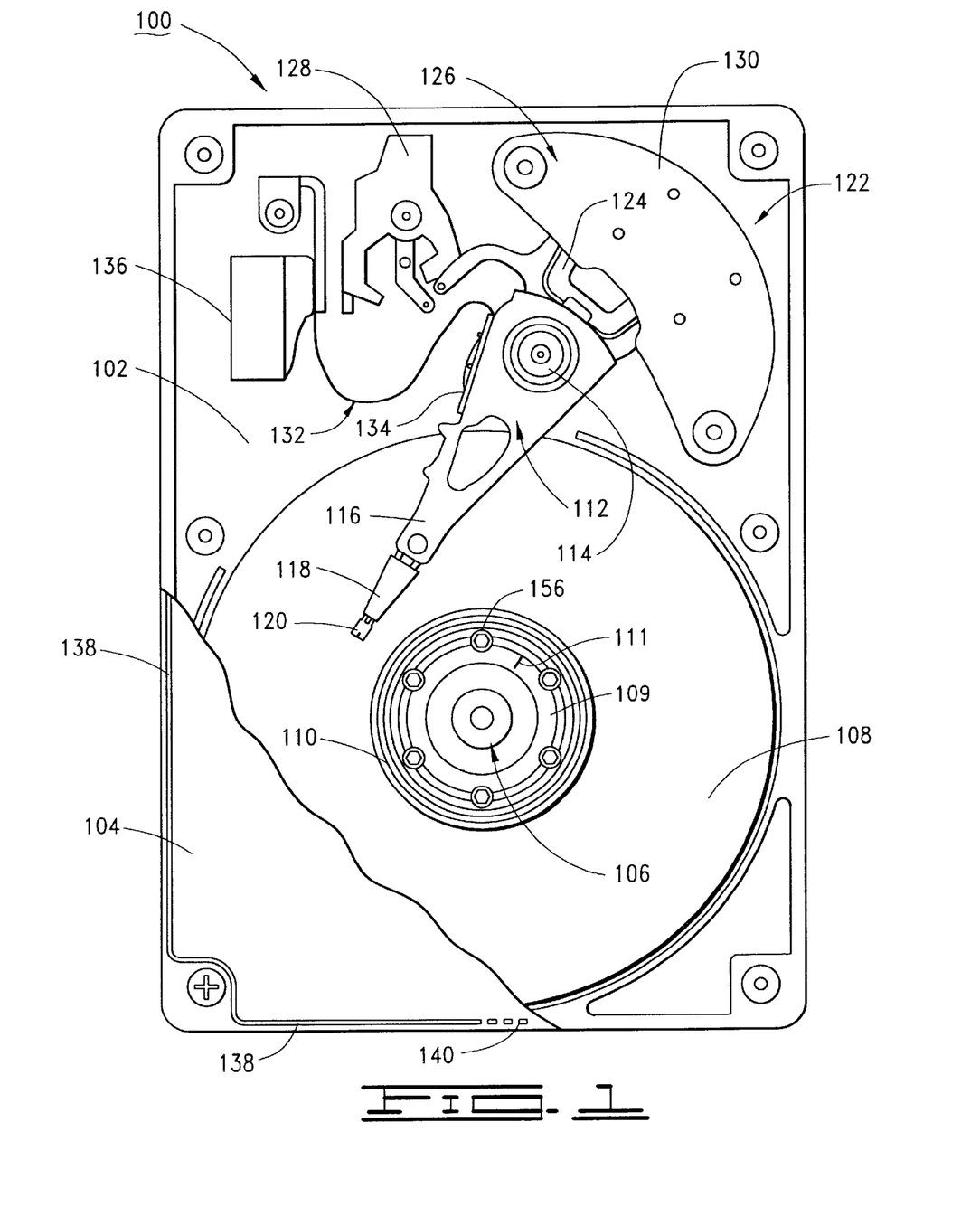
FIG. 1 is a top, partially cutaway view of a disc drive of the type that is assembled by an automated disc drive assembly incorporating a dynamic balance correction station constructed in accordance with the present invention.

Referring to the drawings in general, and more particularly to FIG. 1, shown therein is a top view of a disc drive 100 constructed in accordance with the present invention. The disc drive 100 includes a basedeck 102 to which various disc drive components are mounted, and a top cover 104 (shown in part) which together with the basedeck 102 provides a sealed internal environment for the disc drive 100. Numerous details of construction of the disc drive 100 are not included in the following description as such are well known to those skilled in the art and are believed to be unnecessary for the purpose of describing the present invention.

Mounted to the basedeck 102 is a spindle motor 106 to which several discs 108 are mounted on a spindle motor hub 109 and secured by a clampring 110 for rotation at a constant high speed. In addition to providing support for the stacked discs 108, the spindle motor hub 109 also provides a timing mark 111 used during the assembly process to reference the angular location of a source of rotational imbalance. Adjacent the discs 108 is an actuator assembly 112 (also referred to as an "E-block") which pivots about a cartridge bearing 114 in a rotary fashion. The actuator assembly 112 includes actuator arms 116 (only one shown) that support load arms 118. Each load arm 118 in turn supports read/write heads 120, with each of the read/write heads 120 corresponding to a surface of one of the discs 108. As mentioned, each of the discs 108 has a data recording surface divided into concentric circular data tracks, and the read/write heads 120 are positionably located over data tracks to read data from, or write data to, the tracks.

The actuator assembly 112 is controllably positioned by a voice coil motor assembly (VCM) 122, comprising an actuator coil 124 immersed in the magnetic field generated by a magnet assembly 126. A latch assembly 128 latches the actuator assembly in a predetermined park position when the disc drive 100 is turned off. A magnetically permeable flux path is provided by a steel plate 130 (also called a pole piece) is mounted above the actuator coil 124 to complete the magnetic circuit of the VCM 122.

When controlled DC current is passed through the actuator coil 124, an electromagnetic field is set up which interacts with the magnetic circuit of the VCM 122 to cause the actuator coil 124 to move relative to the magnet assembly 126 in accordance with the well-known Lorentz relationship. As the actuator coil 124 moves, the actuator assembly 112 pivots about the cartridge bearing assembly 114, causing the heads 120 to move over the surfaces of the discs 108 thereby allowing the heads 120 to interact with the data tracks of the discs 108.

To provide the requisite electrical conduction paths between the heads 120 and disc drive read/write circuitry (not shown), read/write head wires (not separately shown) are routed on the actuator assembly 112 from the heads 120 along the load arms 118 and the actuator arms 116 to a flex circuit 132. The read/write head wires are secured to corresponding pads of a flex circuit printed circuit board (PCB) 134 of the flex circuit 132. The flex circuit 132 is connected to a flex circuit bracket 136 in a conventional manner, which in turn is connected through the basedeck 102 to a disc drive PCB (not shown) mounted to the underside of the basedeck 102. The disc drive PCB provides the disc drive read/write circuitry which controls the operation of the heads 120, as well as other interface and control circuitry for the disc drive 100.

To maintain the sealed internal environment for the disc drive 100, a seal gasket 138 is molded onto the top cover 104. Top cover 104 has a plurality of gasket attachment apertures 140 through which gasket material flows during the gasket molding process. A continuum of symmetrically formed gasket material is disposed on both the top and bottom surfaces of the top cover 104 and injected through the apertures 140. During the cure process, the gasket material injected into the gasket attachment apertures 140 bonds the portion of the seal gasket adjacent the top surface of the top cover to the portion of the seal gasket adjacent the bottom portion of the top cover 104, thereby sealing the gasket attachment apertures 140 and forming the seal gasket 138. A gasket material found to be useful for this application is FLUOREL by the 3M company, and more specifically, 3M FLUOREL, FE-5621Q.

Figure 2:
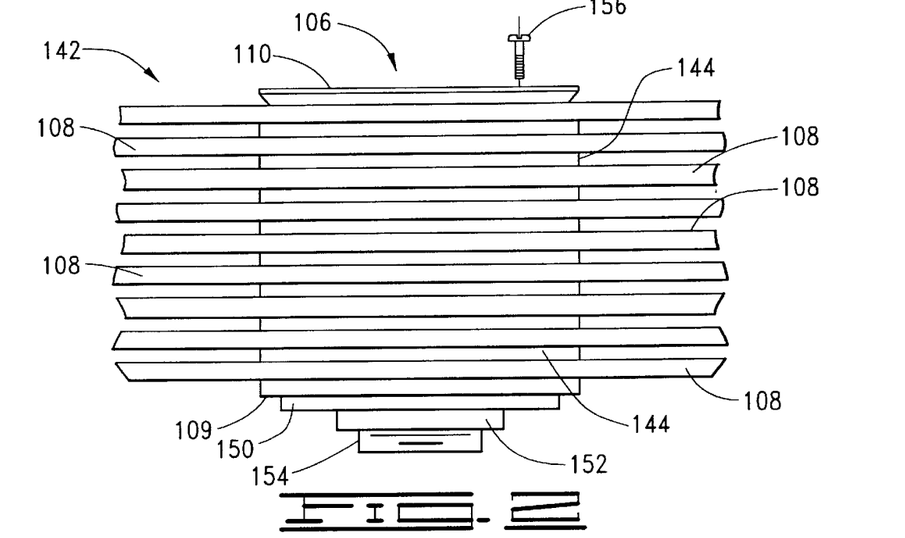
FIG. 2 is an elevational view of the spindle motor of the disc drive of FIG. 1 having a plurality of discs and spacers mounted and secured thereon via a clampring to form a disc pack.

Shown in FIG. 2 is a disc pack 142 which includes alternately stacked disc 108 and spacer rings 144 in the manner of a traditional disc pack on the spindle motor hu 109. The spindle motor hub 109 is attached to the spindle motor 106 via a motor housing 150 which supports an outer race 152, where the motor housing 150 and outer race 152 together spin freely around a stationary threaded shaft 154 by interior roller bearings (not shown) therebetween.

Upon completing the stacking of discs 108 interleaved with the spacer rings 144, with the last stacked component typically being the top disc 108, the clampring 110 is secured to the spindle motor hub 109 by the hardware pieces or fasteners 156. The spindle motor hub 109 provides a component-mounting surface (not separately shown) containing an appropriate number of attachment apertures (not specifically shown) with each fastener 156 engaging one attachment aperture to secure the clampring 110 to the spindle motor hub 109, thereby completing the disc pack 142.

Figure 3:
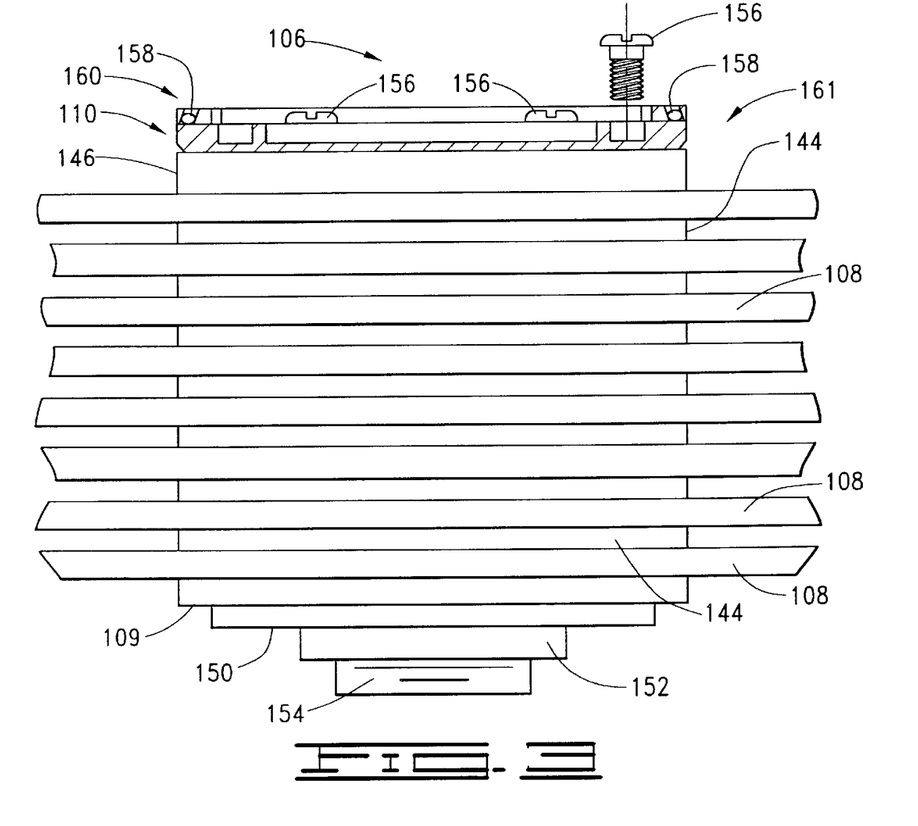
FIG. 3 is a partial cutaway, elevational view of a balance corrected disc pack with a cross-sectional view of the clampring and installed balance correction member.
Figure 4:
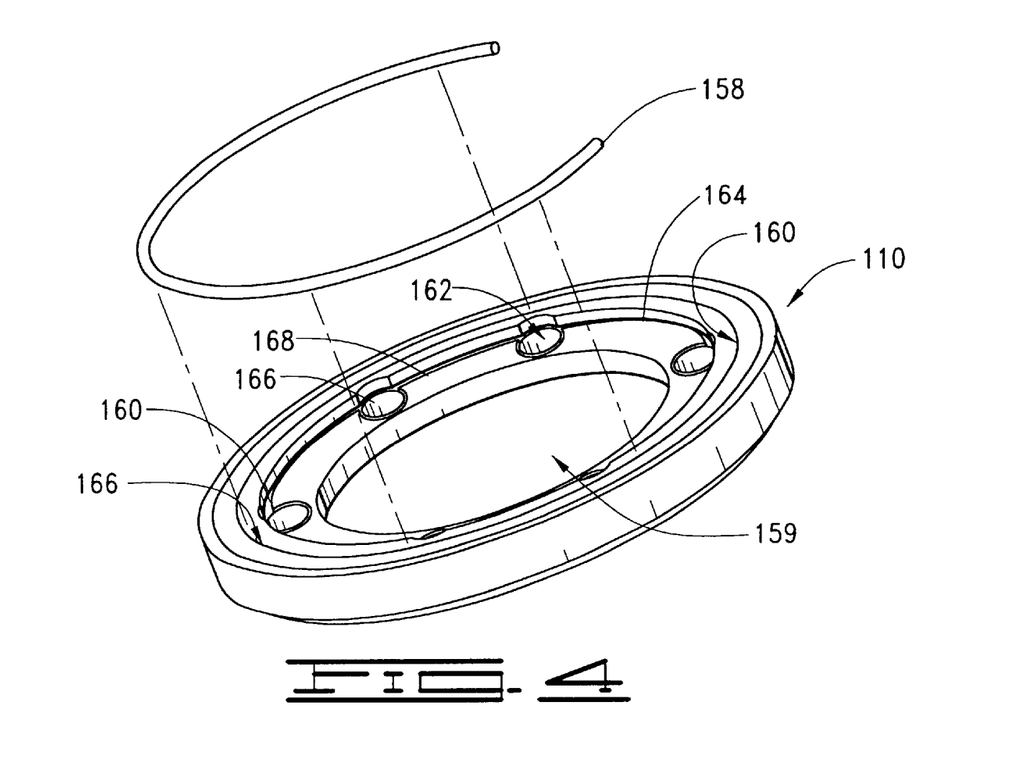
FIG. 4 is a perspective view of the balance correction member and clampring of FIG. 3.

While constructing the disc pack 142, the first component placed on the spindle motor hub is usually one of the discs 108. However, as shown by FIG. 3 the last stacked part that is placed on the spindle motor hub 109 can be an enlarged spacer ring 146 rather than a disc. The enlarged stack ring 146 has a diameter substantially equal to that of the spacer rings 144 and a thickness substantially equal to the sum of the thickness of the spacer ring 144 plus the thickness of the disc 108. Whether the last stacked part is a disc or the enlarged stack ring 146, the clampring 110 imparts a clamping force on the top surface of the last stacked member. The applied clamp force secures the discs 108 of the disc pack 142 in a fixed position for the operational life of disc drive 100. Additionally, FIG. 4 shows a balance correction member 158 confined within an annular balance correction containment cavity 160 in the clampring 110. Proper placement of the balance correction member 158 within an annular balance correction containment cavity 160 results in the formation of a balance corrected disc pack 161.

FIG. 4 provides an illustration of the balance correction member 158 which is a C-shaped wire-ring and other wise referred to herein as a balance correction C-shaped wire-ring 158. To assure shape retention and to instill a spring action response to externally applied forces, the balance correction member 158 is made from full hard 302 stainless steel wire.

As shown in FIG. 4, the clampring 110 has a central bore 159, the annular balance correction containment cavity 160 and six hardware ports 162 which extend through the claimpring 110 symmetrically about the central bore 159. A compressive force distribution surface 164, a relief surface 166 and a step portion 168 are provided as shown. Each hardware port 162 directly corresponds to attachment apertures (not separately shown) in the spindle motor hub 109, and each of the fasteners 156 is disposed to extend through one of the hardware ports 162. The force distribution surface 164 is elevated above the relief surface 166 by the step portion 168. The step portion 168 has a thickness of about 0.006 inches. By simultaneously applying a final torque to the fasteners 156 during the assembly process, the force distribution surface 164 levels the compressive load across the clampring to assure the surface of the disc 108 remains distortion free.

Figure 5:
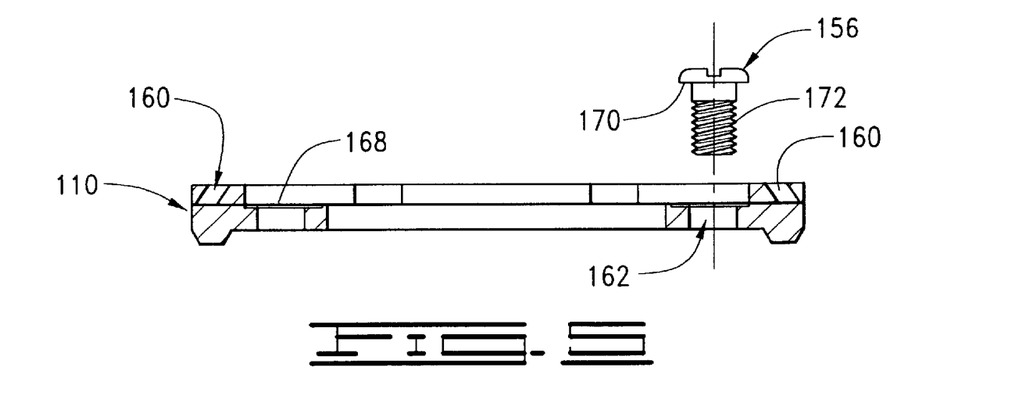
FIG. 5 is a partial elevational, sectional view of the clampring of FIG. 4 showing one of the mating fasteners securing the clampring to the spindle motor hub.

FIG. 5 shows one of the fasteners 156 that secure the clampring 110 to the spindle motor hub 109. Each fastener 156 has a contact surface 170 and a thread engagement portion 172. Also, FIG. 5 shows the cross-sectional geometry of the annular balance correction containment cavity 160. During the assembly process the balance correction membe 158 is placed into a compressed mode while being inserted into the mouth of the annular balance correction containment cavity 160. Upon entry into the mouth of the annular balance correction containment cavity 160, the balance correction member 158 expands, driving the balance correction member 158 to the base of the annular balance correction containment cavity 160. The base of the annular balance correction containment cavity 160 confines the balance correction member 158 and prevents the balance correction member 158 from attaining its free state form, thereby holding the balance correction member 158 in a compressed mode. By holding the C-shaped wire-ring in a compressed state the annular balance correction containment cavity 160 prevents movement of the balance correction member 158.

As disclosed above, each one of the fasteners 156 directly corresponds to one of the hardware ports 162. The thread engagement portion 172 of each of the fasteners 156 passes through the corresponding hardware port 162 to engage an attachment aperture. Upon simultaneous application of a final torque force on each fastener 156, the contact surface 170 of the fastener 156 contacts the force distribution surface 164 and imparts a compressive force on the force distribution surface 164 while being prevented from making contact with the relief surface 166. By confining the contact surface 170 to engagement with the force distribution surface 164 as the means of imparting the simultaneously applied compressive load developed by the finally applied torque force, the runout, velocity, and acceleration (RVA) characteristics remain within those limits required by disc drive 100.

Runout of the discs 108 is a measure of the axial variation of the height of the disc 108 surface around a circumferential arc of a specific radius. The velocity component is a measure of the rate of change of the axial displacement of the surface of the disc 108 around a circumferential arc of a specific radius. The acceleration component of RVA is a measure of the rate of change of the velocity of disc 108 around a circumferential arc of a specific radius.

Figure 6:
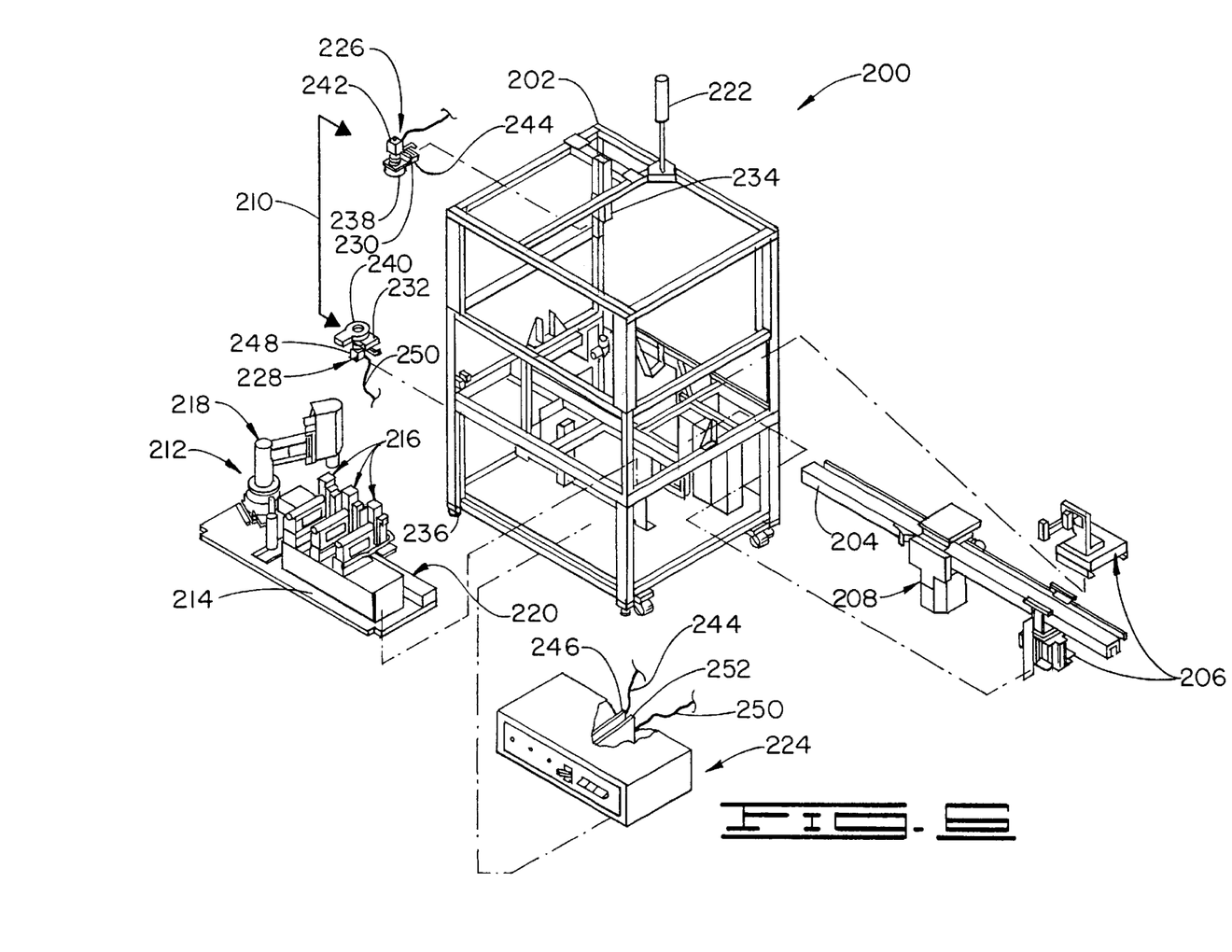
FIG. 6 is an exploded perspective view of a dynamic balance correction station constructed in accordance with the present invention and utilized to install the clampring of FIG. 4 to the disc pack of FIG. 3.

FIG. 6 provides a more clear view of the associated components of the balance correction station 200 used in the production of balance corrected disc drives 100. As shown by FIG. 6, a frame 202 supports a plurality of tooling assemblies used during the process of attaching the balance correction member 158 (FIG. 4) to the disc pack 142 (FIG. 2). Included in FIG. 6 is a conveyor 204 with an attached lift and balance measurement assembly 206 along with an attached lift and locate assembly 208. The conveyor 204, attached to the frame 202, is first used to convey disc packs 142 awaiting balance measurement into the balance correction station 200. The lift and balance measure assembly 206 is used to measure the amount of imbalance present in the disc pack assembly 142.

For disc packs 142 that are measured and found to be within the tolerance range of acceptability for imbalance, the conveyor 204 transfers those disc packs 142 from the balance correction station 200 to other processing equipment. For disc packs 142 that display an amount of imbalance beyond the correction capabilities of the balance correction station 200, the conveyor 204 transfers the from the balance correction station 200 to be reworked or discarded. For each disc pack 142 identified by the lift and balance measure assembly 206 as being outside the imbalance tolerance specifications, but within the correction capabilities of the balance correction station 200, the conveyor 204 transfers the disc pack 142 to the lift and locate assembly 208.

The lift and locate assembly 208 positions the disc pack 142 to assure that both a feature detection assembly 210 and a balance corrected assembly 212 have access to the disc pack 142. The balance correct assembly 212 utilizes a baseplate 214 to provide the controllable, common mounting plane for several component feeder assemblies 216 (also referred to herein as vibratory rod component feeder assemblies), a pick and place manipulator assembly 218 and a component capture and transfer assembly 220. In FIG. 6 three such vibratory rod component feeder assemblies 216 are shown. Each of the component feeder assembly assemblies 216 is used to dispense a specific geometric configuration of the balance correction members 158, that is, the C-shaped wire-rings. The component capture and transfer assembly 220 is positionable beneath any selected one of the component feeder assembly assemblies 216. The component capture and transfer assembly 220 receives the balance correction members 158 dispensed by the component feeder assembly assemblies 216.

Upon receipt of the balance correction member 158, the component capture and transfer assembly 220 transfers the balance correction member 158 to the pick and place manipulator assembly 218. The pick and place manipulator assembly 218 picks the balance correction member 158 from the component capture and transfer assembly 220 and proceeds to place the balance correction member 158 on the disc pack 142.

Also illustrated in FIG. 6 is a clean room automation technician operational status light pole 222. The status light pole 222 provides a quick reference regarding the status of the balance correction station 200 at any time during operation of the balance correction station 200. The status light pole 222 has a number of colored lamps or lenses. One color is selected to signify that the balance correction station 200 is progressing in a typical manner and processing disc packs 142 unencumbered. A second color is selected to signify that the balance correction station 200 is inoperative and available for receiving and processing disc packs 142. A third color is selected to signify that the balance correction station 200 has encountered difficulty while processing the disc pack 142. This arrangement permits a clean room technician to monitor the status of the balance correction station at a glance. A station control computer 224 controls elimination of the status lights of the status light pole 222.

The station control computer 224 is mounted in the base portion of the frame 202. The station control computer 224 provides digital control and communication with the conveyor 204, the lift and balance measure assembly 206, the lift and locate assembly 208, the feature detection assembly 210 and the balance correct assembly 218. It will be noted that the feature detection assembly 210 has two primary assemblies. The first assembly is a downward focusing digital recognition assembly 226 and the second assembly is an upward focusing digital recognition assembly 228.

A first C-clamp camera attachment member 230 secures the downward focusing digital recognition assembly 226. A second C-clamp camera attachment member 232 secures the upward focusing digital recognition assembly 228. The first C-clamp camera attachment member 230 is secured to a downward focusing vision system mounting plate 234, which in turn is attached to the frame 202. The second C-clamp camera attachment member 232 is attached to an upward focusing vision system mounting plate 236 which in turn is attached to the frame 202. In order to ensure consistency in quality of image information gathered by the feature detection assembly 210, both the downward focusing digital recognition assembly 226 and the upward focusing digital recognition assembly 228 are provided with dedicated light sources. A light source 238 is attached to the first C-clamp camera attachment member 230 to provide the illumination required by the downward focusing digital recognition assembly 226, and a second light source 240 is attached to the second C-clamp camera attachment member 232 to provide the illumination needed by the upward focusing digital recognition assembly 228.

The downward focusing digital recognition assembly 226 includes a first digital video camera 242, a first signal cable 244 and a first digital video capture board 246. The first signal cable 244 attaches the first digital video camera 242 to the first video capture board 246. The upward focusing digital recognition assembly 228 includes a second digital video camera 248, a second signal cable 250 and a second digital video capture board 252. The second signal cable 250 attaches the second digital video camera 248 to the second digital video capture board 252. Each of the digital video capture boards 246 and 252 contains pattern recognition software internal to the station control computer 224.

Figure 7:
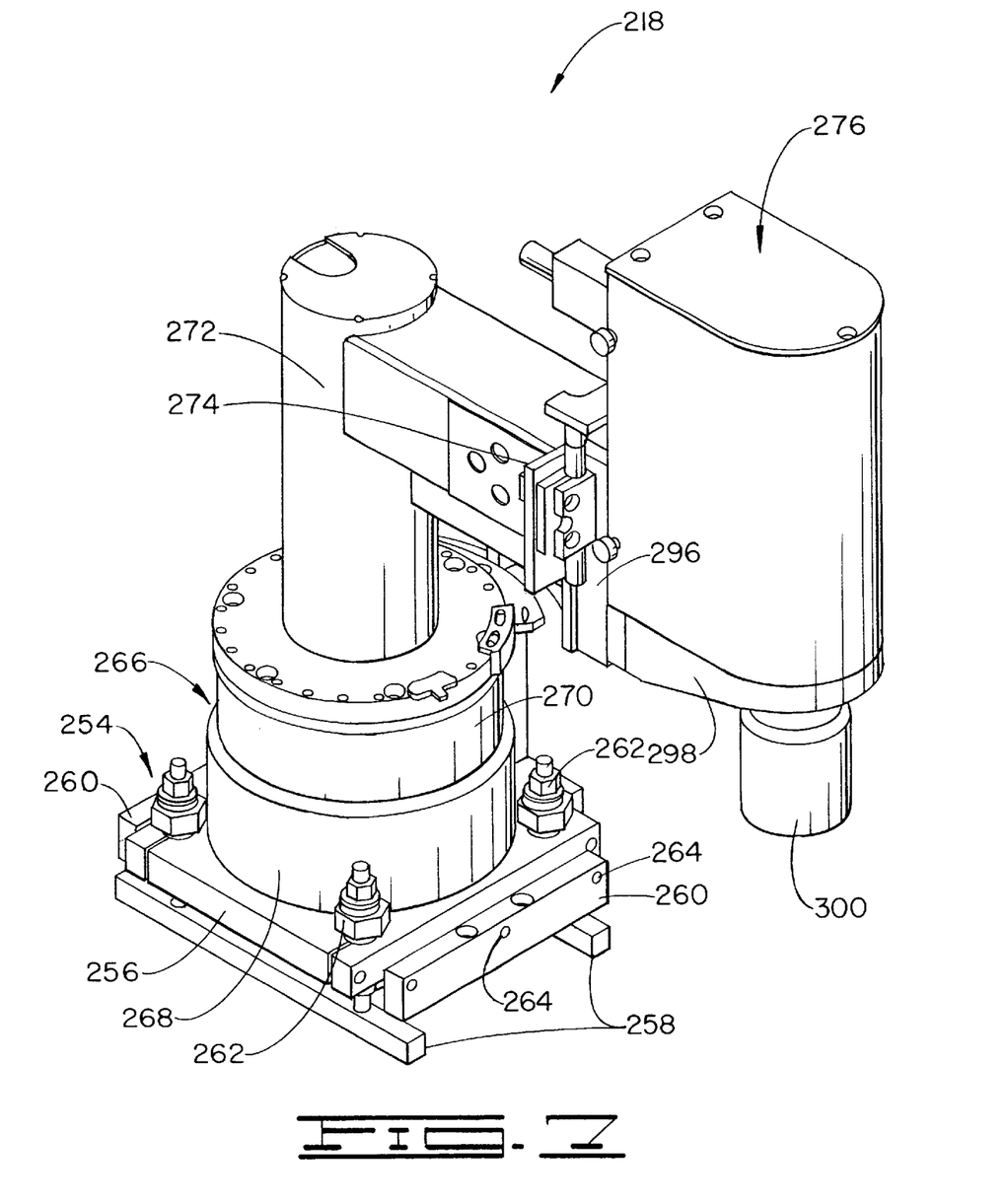
FIG. 7 is a perspective view of a pick and place manipulator assembly of the balance correction station of FIG. 6

Included in the pick and place manipulator assembly 218 of FIG. 7 is a manipulator mounting assembly 254 that has an attachment plate 256, a pair of manipulator clamp bars 258, a pair of centering jack blocks 260, several custom manipulator arm screws 262 and a number of hardware attachment fasteners 264. The attachment plate 256 provides a mounting surface as well as a reference plane to the balance of the components of the pick and place manipulator assembly 218.

The manipulator clamp bars 258 are connected to the attachment plate 256 by the custom manipulator arms screws 252. The manipulator clamp bars 258 rest on the base plate 214 of the balance correction assembly 212. The centering jack blocks 260 are attached to the attachment plate 256 by the attachment fasteners 264. The centering jack blocks 260 are used to both center the pick and place manipulator assembly 218 relative to the base plate 214 of the balance correction assembly 212 and to secure the pick and place manipulator assembly 218 to the balance correct assembly 212. The custom manipulator arms screws 252 are configured to allow adjustments for the pitch of a rotary actuator assembly 266 relative to the disc pack 142 held by the lift and locate assembly 208.

The attachment plate 256 serves as the attachment surface for the rotary actuator assembly 266, which has two primary components. The first is a motion controller 268 attached directly to the attachment plate 256 and the second component is a rotary stepper motor 270 connected to the motion controller 268. The rotary stepper motor 270 provides a manipulator arm 272 an ability to travel along on an arcuate path in the X-Y plane. The motion controller 268 controls both the speed that the manipulator arm 272 traverses through X-Y plane and the ability of the manipulator arm 272 to repeatedly stop accurately at particular points along the arcuate path.

Attached to the rotary stepper motor 270 is the manipulator arm 272 having attached thereto an end effector receiving plate 274 to which an end effector assembly 276 is attached. The manipulator arm 272 defines in initial Z-axis position of the end effector assembly 276, as well as the radius of the arcuate path traveled by the end effector assembly 276. During the operation of the balance correction station 200, the arcuate path traveled by the end effector 267 assures that the end effector assembly 276 communicates with both a disc pack assembly 142 and the component capture and transfer assembly 220.

Figure 8:
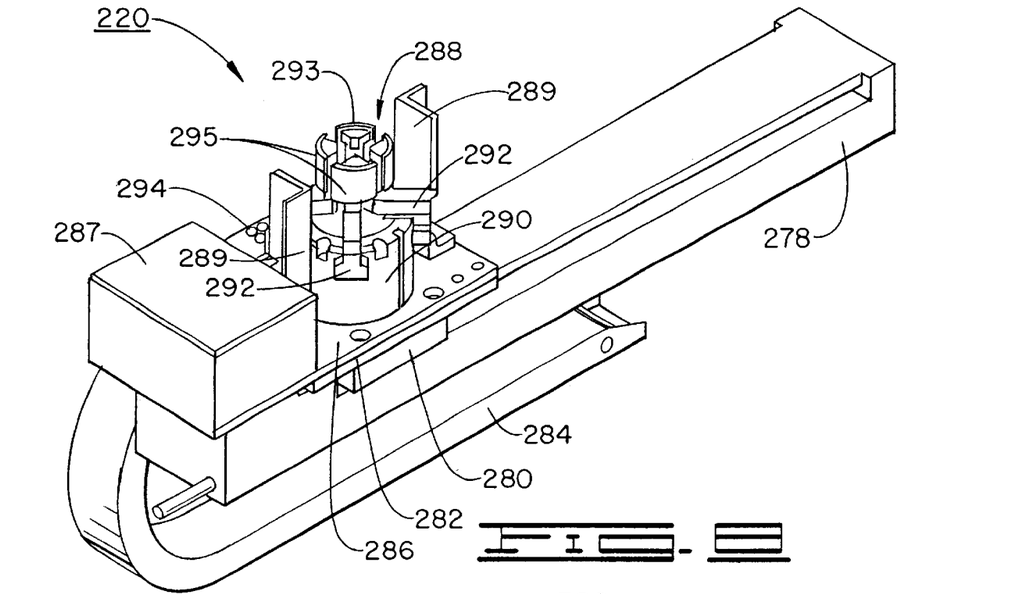
FIG. 8 is an exploded perspective view of a component capture and transfer assembly of the balance correction station of FIG. 6

Included in FIG. 8 is a linear actuator 278 that provides the linear motion required by the component capture and transfer assembly 220 to service each of the several component feeder assembly assemblies 216 during the operation of the balance correction station 200. FIG. 8 further illustrates a positioning plate 280 that is slidingly attached to the linear actuator 278. The positioning plate 280 serves as an attachment host and linear travel vehicle for the remaining components of the component capture and transfer assembly 220. Also shown by FIG. 8 are a transition plate 282 attached to the position plate 280, a flexible cable-way 284 attached to the transition plate 282, a gripper mount plate 286 attached to the transition plate 282, a cover 287 attached to the gripper mount 286, a ring expanding gripper assembly 288 attached to the gripper mount 286 and a pair of sensor mounts 289 attached to the gripper mount 286.

The mounting hole pattern (not shown) of the ring expanding gripper assembly 288 is not the same as the mounting hole pattern (not shown) of the positioning plate 280. As such, the transition plate 282 provides an appropriate mounting hole pattern (not shown) for attaching the transition plate 282 to the positioning plate 280. The transition plate 282 further provides a hole pattern (not shown) for attaching the gripper mount plate 286 to the transition plate 282. The gripper mount plate 286 provides the ability to adjust the pitch of the ring expanding gripper assembly 288 to be consistent with the pitch of the end effector assembly 276. The sensor mounts 289 the structure for mounting sensors (not shown) that detect the presence of the end effector assembly 276 while the cover 287 contributes to the maintenance of the clean room environment by containing particulate generation that occurs during the operation of the balance correction station 200.

FIG. 8 further shows the primary components of the ring expanding gripper assembly 288 including the gripper base 290 which is attached to the gripper mount plate 286. The gripper base 290 supports several gripper sections 292, the number of gripper sections 292 being a function of the particular component handled by the balance correction station 200. In FIG. 8, the number of gripper sections 292 is four as determined by the configuration of the balance correction member 158. Each of the gripper sections 292 is slidingly mounted to the gripper base 290 and attached to a pneumatic cylinder 294. The gripper sections 292 provide the ring expanding gripper assembly 288 the ability to form a variable diameter annular balance correction containment cavity 293.

During operation of the balance correction station 200, the most prominent diameters for the variable diameter annular balance correction containment cavity 293 are the maximum diameter and the minimum diameter. The maximum diameter of the variable diameter annular balance correction containment cavity 293 is defined when the pneumatic cylinder 294 is at maximum stroke in a first direction. The minimum diameter annular balance correction containment cavity 293 is defined when the pneumatic cylinder 294 is at maximum stroke in a second and opposite direction from that of the first maximum stroke position.

Slidingly attached to each of the other gripper sections 292 is a spring-loaded retractable component containment member 295. Collectively the spring-loaded retractable component containment members 295 form a containment wall (not separately shown) of the variable diameter annular balance correction containment cavity 293.

In cooperating with the end effector assembly 276 during the transfer of the balance correction member 158, the spring-loaded retractable component containment members 295 yield to the end effector assembly 276. By yielding, the spring-loaded retractable component containment members 295 allow the balance correction member 158 to expand slightly and pressingly engage the end effector assembly 276.

Returning to FIG. 7, the end effector assembly 276 has three main components: a Z-axis air slide 296, an angle plate 298 and an end effector 300. The Z-axis air slide 296 provides the coupling between the end effector receiving plate 274 and the second primary component the angle plate 298. Additionally, the Z-axis air slide 296 facilitates the vertical travel required by the end effector 300 during the operation of the balance correction station 200. The angle plate 298 provides the structure for attaching the third primary component of the end effector assembly 276, the end effector 300.

Figure 9:
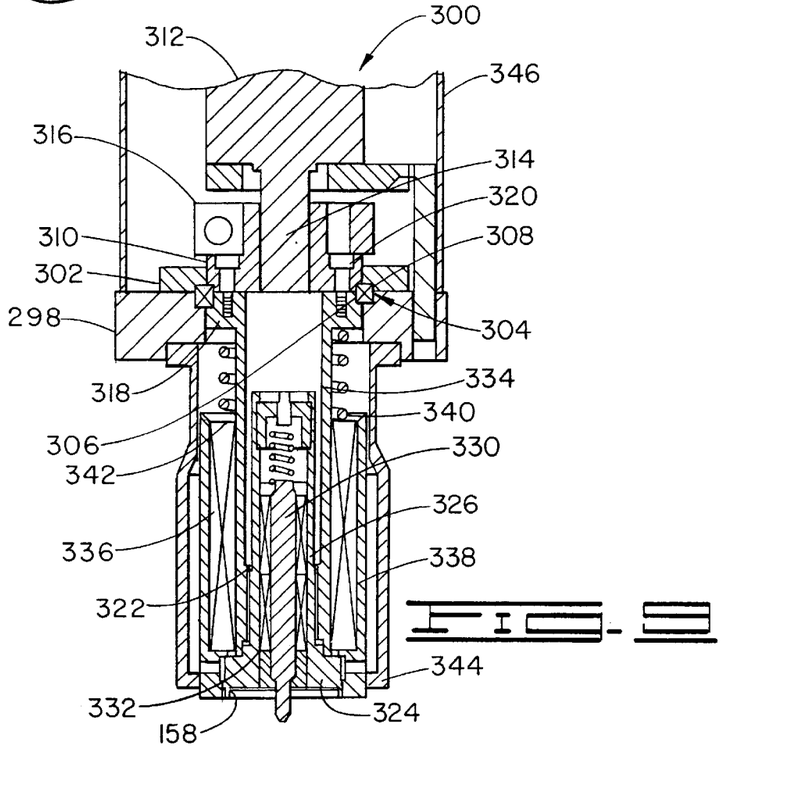
FIG. 9 is a cross-sectional view of an end effector of the pick and place manipulator assembly of FIG. 7.

A detailed view of the mechanics of the end effector 300 is shown in FIG. 9. Included in FIG. 9 is a view of the angle plate 298, an outer race clamp 302 attached to the angle plate 298, a motor hub bearing assembly 304 with an inner race 306 and an outer race 308 disposed within the end effector 300 to bring the outer race 308 into pressing engagement with the outer race clamp 302. The inner race 306 is in pressing engagement with a motor hub 310. The motor hub bearing assembly 304 provides the ability of the motor hub 310 to rotate freely in relation to the angle plate 298. FIG. 9 also shows a rotary indexing motor 312 with an attached rotatable shaft 314. The rotatable shaft 314 is held in compressive engagement with the motor hub 310 by a hub clamp 316. In addition to engaging the outer race clamp 302, the outer race 308, of the motor hub bearing assembly 304, engages the angle plate 298, while the inner race 306 of the motor hub bearing assembly 304 engages a cylindrical plunger housing 318. As shown, the cylindrical plunger housing 318 is attached to the motor hub 310 by shoulder screws 320.

The internal wall of the cylindrical plunger housing 318 has a cylindrical plunger retention member 322, which retains a cylindrical plunger 324. The cylindrical plunger 324 has a retention groove 326 that engages the retention in member 322 of the cylindrical plunger housing 318. FIG. 9 also shows a springloaded centering shaft 330 protruding through the center portion of the cylindrical plunger 324. The spring-loaded centering shaft 330 is used to center the disc pack 142 during the operation of the automation distress assembly station 200. The stability of the spring-loaded centering shaft 330 is maintained by the plurality of alignment bearing assembly 332.

Enclosing a portion of the outer wall of the cylindrical plunger housing 318 is a plunger compression spring 334 which maintains sliding clearance with the outer wall of the cylindrical plunger housing 318. In addition to the plunger compression spring 334 being adjacent the outer wall of the cylindrical plunger housing 318, a plunger bearing assembly 336 maintains sliding engagement with the outer wall of the cylindrical plunger housing 318. The outer race of the plunger bearing assembly 336 maintains pressing contact with a component retainer 338. The plunger bearing assembly is used to promote minimal drag between the component retainer 338 and the cylindrical plunger housing 318 as the component retainer 338 slides along the cylindrical plunger housing 318 during the operation of the balance correction station 200. The component retainer 338 also provides a locker ring retainer groove 340 that confines a locking ring 342.

The locking ring 342 serves a dual purpose. The first purpose for inclusion of the locking ring 342 within the end effector 300 is to restrict the movement of the plunger bearing assembly 336 during the operation of the balance correction station 200. The second is to provide a land for the compression spring 334. The compression spring 334 imparts a compressive load needed to ensure proper functioning of the end effector 300 during operation of the balance correction station 200, and the locking ring 342 facilitates the load absent damage to the plunger bearing assembly 336. The plunger compression spring 334 permits travel of the component retainer 338 in the direction of the shoulder screws 320, whereas the cylindrical plunger 324 restricts travel of the component retainer 338 when the cylindrical plunger 324 in moving in a direction away from the shoulder screws 320.

To maintain a clean environment in the clean room during the operation of the balance correction station 200, two additional components of the end effector 300 are shown in FIG. 9. A vacuum housing 344 is attached to the angle plate 298 which in conjunction with a vacuum line (not shown), provides a channel for removal of all particulate matter generated in and around the component retainer 338 during operation of the balance correction station 200. Similarly, a motor cover 346 in concert with another vacuum line (not shown) provides a channel and method for removal of particulate matter generated by the rotary indexing mortar 312 and the components associated with the rotary indexing mortar 312. The removal of the generated particulate matter is ongoing during the operation of the balance correction station 200.

Figure 10:
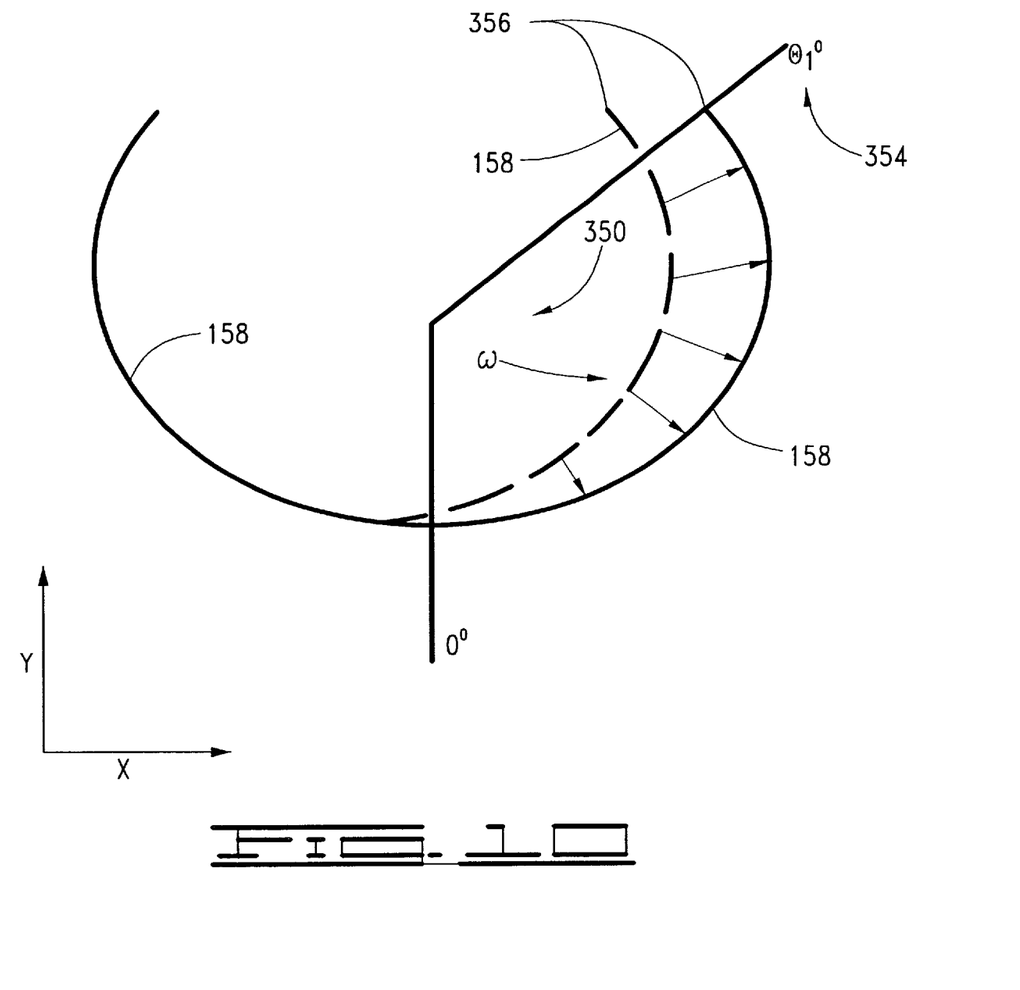
FIG. 10 is a plan view of the balance correction member of FIG. 3 in both an uninstalled configuration and a portion of one half of the balance installed balance correction member in an installed configuration (shown in dashed lines).

Turning to FIG. 10, the final installed shape of the balance correction member 158 is circular. The uninstalled shape is approximately elliptical. The elliptical initial shape is determined by the following method. A linear load distribution that meets the following conditions was applied to a circular ring solution for one half of the balance correction C-shaped wire-ring 158, that is where:

$$\omega = A\theta + B \quad \text{(Equation 1)}$$

Where A and B are constants the load ω 350 is linear at any point located at angle θ, measured from a center point 352, at 0°, along the path of the balance correction member 158 between center point 352 and end point $\theta_1$ 354. FIG. 10 further shows $\theta_1$ 354 as an angle measured from a center point 352 of the balance correction member 158 to an end point 356 of the balance correction member 158 encompassing one half of the balance correction member 158 where the following equation holds:

$$\frac{2}{\theta_1}\sin\theta_1 - 2B\sin\theta_1 + \frac{2\cos\theta_1}{\theta_1^2} - \frac{2B}{\theta_1}\cos\theta_1 + B\sin\theta_1 - \frac{2}{\theta_1^2} + \frac{2B}{\theta_1} = 0 \quad \text{(Equation 2)}$$

Solving for B, the following equation is obtained:

$$B = \frac{\frac{-2}{\theta_1}\sin\theta_1 + \frac{2}{\theta_1^2} - \frac{2\cos\theta_1}{\theta_1^2}}{-2\sin\theta_1 - \frac{2}{\theta_1}\cos\theta_1 + \sin\theta_1 + \frac{2}{\theta_1}} \quad \text{(Equation 3)}$$

Equation 3 can be substituted into equation 2 and solved for A. With A and B known, a FEM (Finite Element Analysis) model can be created for a circular ring with the load applied as described above. The solution of the FEM model will give the initial shape.

The mass of the balance correction member 158 needed to overcome an amount of imbalance present in the disc pack 142 is determined by the over length of the balance correction C-shaped wire-ring 158, hence $\theta_1$ is determined by the amount of imbalance that needs to be produced by the balance correction member 158. Computer generated empirical data has shown the total load requirement of the ring to stay in place during vertical shock is 2 lbs. or for one half the ring (1 lb.). In solving for the load for one half the ring where the load $\omega$ is linear with angle $\theta$ the equation is:

$$1 \text{ lb.} = \int_0^{\theta_1} \omega \, d\theta \quad \text{(Equation 4)}$$

Substituting equation 1 for $\omega$ the equation becomes:

$$\int_0^{\theta_1} (A\theta + B) d\theta = \frac{1}{2} A\theta_1^2 + B\theta_1 \text{ and} \quad \text{(Equation 5)}$$

$$A = \frac{2 - 2B\theta_1}{\theta_1^2}$$

The sum of the forces in the Y direction must be zero for static equilibrium, therefore the equation is:

$$\int_0^{\theta_1} \omega \cos\theta \, d\theta = 0 \quad \text{(Equation 6)}$$

Substituting equation 1 for $\omega$ the equation becomes:

$$\int_0^{\theta_1} (A\theta \cos\theta + B\cos\theta) d\theta = 0 \quad \text{(Equation 7)}$$

$$= A\theta \sin\theta + A\cos\theta + B\sin\theta \Big]_0^{\theta_1} = 0$$

$$= A\theta_1 \sin\theta_1 + A\cos\theta_1 + B\sin\theta_1 - A = 0$$

Substituting equation 3 for A, the equation can be solved for B and becomes:

$$\frac{2 - 2B\theta_1}{\theta_1^2} \theta_1 \sin\theta_1 + \frac{2 - 2B\theta_1}{\theta_1^2} \cos\theta_1 + B\sin\theta_1 - \frac{2 + 2B\theta_1}{\theta_1^2} = 0 \quad \text{(Equation 8)}$$

OPERATION

The station control computer 224 of FIG. 6, used for process management and control, signals the conveyor 204 of FIG. 6 that responds by conveying a disc pack 142 of FIG. 2 into the balance correction station 200 of FIG. 6 to begin processing the disc pack 142. First, the disc pack 142 is positioned into the lift and balance measure assembly 206 of FIG. 6 to measure the amount and location of imbalance present in the disc pack and, if imbalance is present, report the location of the imbalance relative to the timing mark 111 of FIG. 1 of the disc pack 142 to the station control computer 224. To make the required measurements, the lift and balance measure assembly 206 activates the spindle motor 106 of FIG. 1 to accelerate the disc pack 142 to its operational velocity. When the operational velocity is achieved, measurements are taken using traditional balance measurement instruments.

If the imbalance present in the disc pack 142 is within an acceptable tolerance level no additional processing will be performed on the disc pack 142 and the disc pack 142 will be returned to the conveyor 204 to be transported out of the balance correction station 200. If the imbalance present in the disc pack 142 exceeds the correction ability of the balance correction station 200 no additional processing will be performed on the disc pack 142 and the disc pack 142 will be returned to the conveyor 204 to be transported out of the balance correction station 200. If the imbalance present in the disc pack 142 exceeds the tolerance level, but remains with the correction ability of the balance correction station 200, the disc pack 142 will be placed on the conveyor 204 and transported to the lift and locate assembly 208 of FIG. 4.

The lift and locate assembly 208 positions the disc pack 142 for receipt of a balance correction member 158. The balance correction station 200 has a number of varying mass balance correction members 158 from which to select. The specific balance correction member 158 selected depends on the amount of mass required to counteract the imbalance present in the disc pack 142. The general configuration, of each type of balance correction member 158 is a C-shaped wire-ring. The length of wire used to form the balance correction member 158 determines the amount of mass present in each type of balance correction member 158. The greater the length of wire in the balance correction member 158, the greater the mass of the balance correction member 158. And conversely, the shorter the length of wire in the balance correction member 158, the less the mass of the balance correction member 158. Having identified the proper mass to be added to the disc pack 142, the automated disc drive assembly station 200 selects one of the plurality of component feeder assembly assemblies 216 of FIG. 4 as each contains a different weighted balance correction member 158.

The feature detection assembly 210 of FIG. 4 locates the gap portion of the C-shaped wire-ring and the position of the timing mark 111 on the spindle motor hub 109. The feature detection assembly 210 includes a downward focusing digital video camera 242 of FIG. 4 and an upward focusing digital video camera 248 of FIG. 4. The downward focusing digital camera 242 is stationary and focused to record an electronic image of the angular position of the timing mark 111 after the lift and locate assembly 208 positions the disc pack 142 for receipt of a balance correction member 158.

Having determined the proper balance correction member 158, the station control computer 224 activates the balance correct assembly 218 of FIG. 4 which responds by aligning the component capture and transfer assembly 220 of FIG. 4 beneath the component feeder assembly 216 containing the balance correction member 158 of proper mass. With the component capture and transfer assembly 220 in position, the station control computer signals the component feeder assembly 216 to dispense the balance correction member 158 into the variable diameter annular balance correction containment cavity 293 of FIG. 8. Four spring loaded gripper sections 292 of FIG. 8 on the gripper base 290 of FIG. 8 define the variable diameter annular balance correction containment cavity 293. While awaiting receipt of the balance correction member 158, the four spring loaded gripper sections 292 define the maximum diameter of the variable diameter annular balance correction containment cavity 293. Upon receipt of the balance correction member 158, the four spring loaded gripper sections 292 move together to from the minimum diameter of the variable diameter annular balance correction containment cavity 293, the movement slightly collapses the diameter of the balance correction member 158 to allow transfer of the balance correction member 158 to the pick and place manipulator assembly 218 of FIG. 7.

With the balance correction member 158 secured, the balance correct assembly 218 transports the balance correction member 158 from beneath the component feeder assembly 216 into alignment with the pick and place manipulator assembly 218. Then the station control computer 224 activates the pick and place manipulation assembly 218 which responds by activating the rotary stepper motor 270 of FIG. 7 to position the end effector assembly 276 of FIG. 7 above the balance correction member 158. With the end effector assembly 267 positioned for pick up, the station control computer 224 signals the Z-axis air slide 296 of FIG. 7 of the end effector assembly 276 to place the end effector 300 of FIG. 7 in mating contact with the four spring loaded gripper sections 292 and depress the four spring loaded gripper sections 292.

At the bottom of the stroke of the Z-axis air slide 296, the end effector 300 depresses the four spring loaded gripper sections 292 to a position below the plane containing the balance correction member 158. With the gripper sections below the balance correction member 158 the balance correction member 158 is allowed to expand slightly and come to rest in pressing engagement with a component retainer 338 of FIG. 9 of the end effector 300 and adjacent a cylindrical plunger 324 of FIG. 9 of the end effector 300. With the balance correction member 158 secured by the end effector 300, the Z-axis air slide 296 returns the end effector 300 to the home position and the rotary stepper motor 270 re-positions the end effector assembly 276 above the upward focusing digital camera 248.

The upward focusing digital camera 248 records and reports to the station control computer 224 the position of the gap between the ends of the C-shaper wire-ring of the balance correction member 158, relative to the location of the timing mark 111 of the disc pack 142. Based on the relative positional information of the imbalance source, the timing mark 111 and the gap between the ends of the C-shaped wire-ring, the station control computer 224 determines the placement position of the balance correction member 158 within the disc pack 142. Once the placement position of the balance correction member 158 is determined, the station control computer 224 signals a rotary indexing motor 312 of FIG. 9 of the end effector 300 to rotate the position of the balance correction member 158. When the gap between the ends of the C-shaped wire-ring of the balance correction member 158 is positioned to assures the mass of the balance correction member 158 is correctly positioned to offset the imbalance present in the disc pack 142, the rotation stops.

Next the balance correction member 158 is placed in an annular balance correction containment cavity 160 of FIG. 3 of a clampring 110 of the disc pack 142. To effect the placement, the station control computer 224 signals a Z-axis air slide to place an end effector 300 in mating contact with the clampring 110. Upon engagement with the clampring 110, the Z-axis air slide 296 continues in the downward stroke causing the component retainer 338 of the end effector 300 to retreat away from the clampring 110 to expose the balance correction member 158 to the annular balance correction containment cavity 160. As the component retainer 338 passes by the balance correction member 158, the balance correction member 158 expands slightly and enters the annular balance correction containment cavity 160, the expansion continues until the balance correction member 158 comes to rest at the base of the annular balance correction containment cavity 160. The balance correction member 158 is constrained by the annular balance correction containment cavity 160 and continues to exert a spring force on the annular balance correction containment cavity 160 to maintain the position of the balance correction member 158 over the life of the disc drive 100 of FIG. 1.

Accordingly, the present invention is directed to an apparatus and method for balancing a rotary object, such as a disc drive disc pack. As exemplified by preferred embodiments, a clampring 1 10 is used to provide a clamping force to clamp discs 108 to a spindle motor hub 106 rotatable about an axis. An annular recess (balance correction containment cavity 160) is formed in the clampring which circumferentially extends about the axis. A balance correction member 158 is provided as a c-shaped ring with a substantially elliptical shape formed from a wire having a selected length and a nominally uniform cross-sectional area along the selected length. The balance correction member is compressed to a substantially circular shape and then placed within the annular recess so that the compressed balance correction member expands and compressingly engages the rotatable body.

In a preferred embodiment, the balance correction member is installed using an automated balance correction station 200 having a frame 202 which supports a lift and balance measure assembly 206, a lift and locate assembly 208 and a balance correct assembly 212. The lift and balance measure assembly measures the rotational imbalance of the disc pack. The lift and locate assembly positions the disc pack for receipt of the balance correction member. The balance correct assembly releases a balance correction member in response to the measured rotational imbalance, compresses the balance correction member to a subtantially circular shape, and places the compressed balance correction member adjacent the disc pack so that the compressed balance correction member expands and compressingly engages the annular recess in the disc pack.

For purposes of the appended claims, it will be readily understood consistent with the foregoing discussion that the "nominally uniform cross-sectional area" of the claimed "balance correction member" will be defined as a nominally uniform cross-sectional diameter of the wire across the length of the wire, as shown by the two cross-sectional areas of the balance correction member 158 of FIG. 3, and will not be extended to refer either to a diameter of the c-shape itself or to a cross-sectional area taken along another axis (such as the length) of the wire. .

It will be clear that the present invention is well adapted to attain the ends and advantages mentioned as well as those inherent therein. While presently preferred embodiments of the invention have been described for purposes of the disclosure, it will be understood that numerous changes can be made which will readily suggest themselves to those skilled in the art. Such changes are encompassed within the spirit of the invention disclosed and as defined in the appended claims.

What is claimed it is:

1. A method for removing imbalance in an object rotatable about an axis, the object having a rotatable body with a distal surface which circumferentially extends about the axis, the method comprising steps of:
- (a) forming an annular recess in the rotatable body which circumferentially extends about the axis and depends from the distal surface;
- (b) providing a balance correction member comprising a c-shaped ring with a substantially elliptical shape formed from a wire having a selected length and a nominally uniform cross-sectional area;
- (c) compressing the balance correction member to a substantially circular shape; and (d) placing the compressed balance correction member within the annular recess so that the compressed balance correction member expands and compressingly engages the rotatable body.

2. The method of claim 1, wherein the forming step (a) comprises a step of providing at least first, second and third recessed surfaces which cooperatively define the annular recess, the first recessed surface extending from the rotatable surface into the object body, the second recessed surface radially extending from the first recessed surface away from the axis, and the third recessed surface extending from the second recessed surface to the distal surface at an oblique angle with respect to the axis so that a portion of the third recessed surface adjacent the second recessed surface is at a greater radial distance from the axis than a portion of the third recessed surface adjacent the distal surface.

3. The method of claim 2, wherein the placing step (d) comprises steps of positioning the compressed balance correction member adjacent the portion of the third recessed surface adjacent the distal surface and releasing the compressed balance correction member so that, as the compressed balance correction member expands, the balance correction member moves down the third recessed surface and comes to rest in a final compressed state bearing against the portion of the third recessed surface adjacent the second recessed surface.

4. The method of claim 1, wherein the providing step (b) comprises steps of measuring imbalance in the rotatable object and selecting the balance correction member from a population of substantially identical balance correction members with different geometric configurations to correct the measured imbalance of the rotatable object.

5. The method of claim 4, wherein the providing step (b) further comprises a step of configuring the balance correction member to have the substantially elliptical shape in an uncompressed state determined by a linear load distribution satisfying a relation ω=Aθ+B where A and B are constants and ω is a linear load with angle θ, and wherein a sum of forces imparted by the balance correction member when installed in the rotatable body normal to the axis satisfies a relation $$\int_0^{\theta_1} \omega \cos\theta \, d\theta = 0,$$

where $\theta_1$ is d an amount of counterbalance required to remove the measure balance in the rotatable body.

6. A method for attaching a balance correction member to a disc pack of a disc drive to form a balance corrected disc pack, the disc pack rotatable about an axis and having a spindle motor hub about which is arranged at least one magnetic recording disc and a clampring which exerts a clamping force on the disc, the method comprising steps of:

(a) measuring imbalance present in the disc pack;

(b) selecting a balance correction member in relation to the measured imbalance in the disc pack, the balance correction member comprising a c-shaped ring with a substantially elliptical shape formed from a wire having a selected length and a nominally uniform cross-sectional area along the selected length;

(c) compressing the balance correction member into a substantially circular shape; and (d) placing the compressed balance correction member within an annular recess of the clampring so that the compressed balance correction member expands and compressingly engages the rotatable body.

7. The method of claim 6 wherein the spindle motor hub includes a timing mark at a selected angular position and wherein the measuring step (a) comprises steps of:

(a1) accelerating the disc pack to a constant velocity to measure imbalance present in the disc pack relative to the timing mark; and (a2) reporting a position and amount of imbalance present in the disc pack relative to the timing mark.

8. The method of claim 6, further comprising a step of forming the annular recess of the clampring by providing at least first, second and third recessed surfaces which cooperatively define the annular recess, the first recessed surface extending from a top surface of the clampring, the second recessed surface radially extending from the first recessed surface away from the axis, and the third recessed surface extending from the second recessed surface to the top surface at an oblique angle with respect to the axis so that a portion of the third recessed surface adjacent the second recessed surface is at a greater radial distance from the axis than a portion of the third recessed surface adjacent the distal surface.

9. The method of claim 8, wherein the placing step (d) comprises steps of positioning the compressed balance correction member adjacent the portion of the third recessed surface adjacent the top surface and releasing the compressed balance correction member so that, as the compressed balance correction member expands, the balance correction member moves down the third recessed surface and comes to rest in a final compressed state bearing against the portion of the third recessed surface adjacent the second recessed surface.

* * * * *

UNITED STATES PATENT AND TRADEMARK OFFICE
CERTIFICATE OF CORRECTION

PATENT NO. : 6,550,328 B1  
DATED : April 22, 2003  
INVENTOR(S) : Stephen G. Horning et al.

It is certified that error appears in the above-identified patent and that said Letters Patent is hereby corrected as shown below:

<u>Title page,</u>  
Item [73], Assignee, replace "JpMorgan Chase Bank, New York, NY (US)" with  
-- Seagate Technology LLC, Scotts Valley, CA (US) --.

Signed and Sealed this

Fifth Day of August, 2003

JAMES E. ROGAN  
*Director of the United States Patent and Trademark Office*